United States Patent [19]
Ray

[11] Patent Number: 4,804,642
[45] Date of Patent: Feb. 14, 1989

[54] ALUMINUM BORATE BASED CERAMIC COMPOSITE

[75] Inventor: Siba P. Ray, Plum Boro, Pa.

[73] Assignee: Aluminum Company of America, Pittsburgh, Pa.

[21] Appl. No.: 935,793

[22] Filed: Nov. 28, 1986

Related U.S. Application Data

[63] Continuation-in-part of Ser. No. 604,913, Apr. 27, 1984, abandoned.

[51] Int. Cl.$^4$ .................. C04B 35/10; C04B 35/56; C04B 35/58
[52] U.S. Cl. .................................. 501/87; 501/89; 501/96; 501/98
[58] Field of Search .................. 501/87, 89, 96, 98

[56] References Cited

U.S. PATENT DOCUMENTS

| | | | |
|---|---|---|---|
| 2,118,143 | 5/1938 | Benner et al. | 106/9 |
| 3,080,242 | 3/1963 | Berry | 106/65 |
| 3,350,166 | 10/1967 | Alley et al. | 23/59 |
| 3,503,765 | 3/1970 | Blaze | 106/65 |
| 3,795,524 | 3/1971 | Sowman | 106/65 |
| 4,510,253 | 4/1985 | Felice et al. | 501/127 |
| 4,522,926 | 6/1985 | Felice | 501/132 |
| 4,540,475 | 9/1985 | De Angelis | 204/67 |

FOREIGN PATENT DOCUMENTS 2561945 10/1985 France .

*Primary Examiner*—Mark L. Bell
*Attorney, Agent, or Firm*—Andrew Alexander; John P. Taylor

[57] ABSTRACT

Disclosed is an aluminum borate base ceramic composite comprised of a metal compound and a composition having the formula $Al_xB_yO_z$.

11 Claims, 2 Drawing Sheets

S# 578940-8
Major Alpha Al2O3
Major 2Al2O3.B2O3 Type Phase
Calcined at 800 C

S# 578940-9
Major Alpha Al2O3
Major 2Al2O3.B2O3 Type Phase
Calcined at 900 C

S# 5789-40-10
Major Alpha Al2O3
Major 2Al2O3.B2O3 Type Phase
Calcined at 1000 C

S# 578940-12
Major Al18B4O33
Minor Alpha Al2O3
Calcined at 1150 C

S# 578914
Major Al18B4O33
Minor Alpha Al2O3
1300 deg.C

ALUMINUM BORATE BASED CERAMIC COMPOSITE

CROSS-REFERENCE TO RELATED APPLICATIONS

This application is a continuation-in-part of Ray U.S. patent application Ser No. 604,913 filed April 27, 1984, now abandoned.

BACKGROUND OF THE INVENTION

1. Field of the Invention

This invention relates to a light weight shaped opaque aluminum borate product. More particularly, this invention relates to a high strength, light weight, shaped opaque aluminum borate product formed by reacting an aluminum oxide and a boron oxide and a method of making the aluminum borate material.

2. Description of the Related Art

Lightweight ceramic materials formed from aluminum oxide mixed with phases of other metal oxides are desirable from the standpoint of weight as well as chemical inertness. In Ray U.S. patent application Ser. No. 604,913, there is described and claimed a ceramic which comprises an interwoven mixture of $TiB_2$ and $Al_2O_3$ formed by reacting together a mixture of $TiO_2$, $B_2O_3$ and aluminum metal. This ceramic material has been found to possess excellent electrical conductivity and chemical inertness properties even at elevated temperatures, making it an excellent material for use as an electrode in an electrolytic reduction cell at elevated temperatures.

However, such ceramic materials or cermets are not necessarily characterized by light weight nor do they always possess high strength qualities, particularly if they have been blended to optimize other properties such as chemical inertness and electrical conductivity.

The formulation of ceramic materials from oxides of aluminum and boron would be expected to be somewhat lighter than aluminum oxide, depending upon the amount of boron oxide used, since the density of aluminum oxide is about 3.97 and the density of boron oxide is about 2.46.

Sowman U.S. Pat. No. 3,795,524 describes the formation of transparent extrusions such as fibers of aluminum borate and aluminum borosilicate materials from an aqueous solution or dispersion, e.g., an aqueous solution of a boric acid-stabilized aluminum acetate, which is concentrated into extrudable gels, subsequently dried, and then fired at temperatures up to 1000° C. to form fibers of transparent aluminum borate or aluminum borosilicate. The patentee states that low density aluminum borate fibers may be formed in this manner having an $Al_2O_3:B_2O_3$ mole ratio from 9:2 to 3:1.5. Sowman, however, cautions against firing at temperatures as high as 1200° C., stating that fibers fired at this temperature are weak and fragile.

DeAngelis U.S. Pat. No. 4,540,475 discloses the formation of a multiple phase body containing phases of $TiB_2$, $Al_2O_3$ and $9Al_2O_3 2B_2O_3$ which was formed from a dry mixture of $AlB_2$, $TiO_2$ and $Al_2O_3$ which was pressed at 1500 psi and then fired at 1500° C.

Baumann and Moore in an article entitled "Electric Furnace Boroaluminate" in *The Journal of the American Ceramic Society*, Oct. 1, 1942, Vol. 25, No. 14, disclose that boroaluminate has been produced as a crystalline material by electric furnace fusion. The crystal form is orthorhombic, and it appears to melt incongruently and is analogous in several ways to mullite.

SUMMARY OF THE INVENTION

It has now been discovered that a moderately high strength, low density, shaped opaque aluminum borate ceramic product may be formed.

It is, therefore, an object of this invention to provide a high strength, low density shaped opaque aluminum borate ceramic product.

It is another object of this invention to provide a high strength, low density shaped opaque aluminum borate product having an MOR of at least 42,000 psi and a surprisingly low density of about 2.9 grams/cm³.

It is yet another object of this invention to provide a high strength, low density shaped opaque aluminum borate product formed by reacting together a mixture of an aluminum oxide and a boron oxide, for example.

It is a further object of this invention to provide a method for making a high strength, low density shaped opaque aluminum borate ceramic product which comprises reacting together a mixture preferably of an aluminum oxide and boron oxide at a temperature of from 900° to 1400° C., particularizing the reacted mixture, and then sintering the particulate at a temperature of from about 1300° to 1400° C. while maintaining a pressure of 2500 to 3500 psi on the particulate during the sintering.

An aluminum borate base ceramic composite can be formed, the composite containing a metal compound, e.g., metal oxide, boride, carbide or nitride, and a composition having the formula $Al_xB_yO_z$ wherein x is in the range of 16 to 22, y is in the range of 2 to 5 and z is in the range of 30 to 36. The composition can be formed by reacting an aluminum compound and a boron compound, at least one of the compounds containing oxygen.

These and other objects of the invention will be apparent from the following description and accompanying flow sheet.

DETAILED DESCRIPTION OF THE INVENTION

Figure 1:
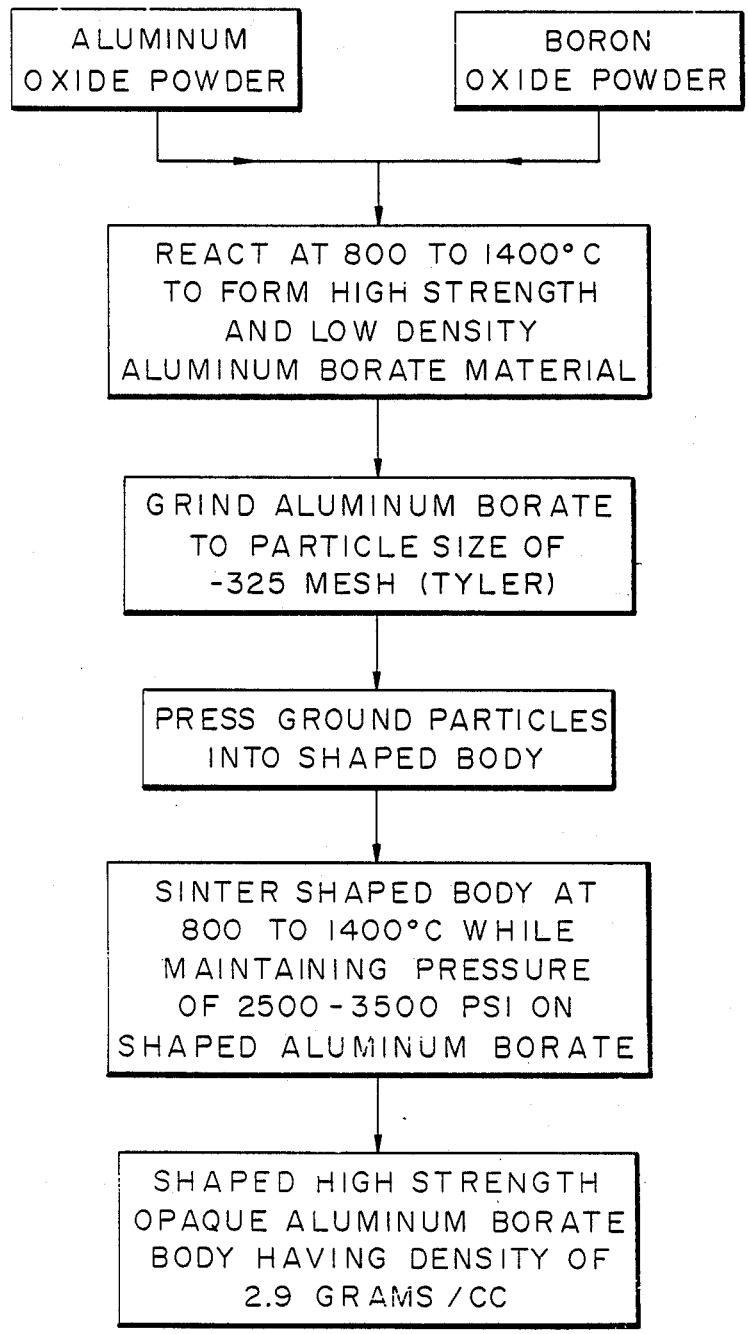
FIG. 1 is a flow sheet illustrating the process of the invention.

The high strength and low density shaped opaque aluminum borate ceramic product of the invention may be characterized by the formula $Al_xB_yO_z$ wherein x=16 to 22, y=2 to 5 and z=30 to 36. Preferably, the high strength and low density aluminum borate material of the invention comprises, in one aspect of the invention, stoichiometry represented by the formula $Al_{18}B_4O_{33}$.

The high strength, low density aluminum borate may be formed by initially mixing together a powder mixture of finely ground aluminum oxide and boron oxide. The aluminum oxide powder may comprise Alcoa A-16 super ground alumina having an average particle size of 0.4 micrometer while the boron oxide may comprise Fisher A-76 $B_2O_3$ powder or boria powder which should have an average particle size of about −325 mesh (Tyler). The powder mixture may then be heated at from 900° to 1400° C. for a period of from 5 minutes to 2 days to form a fiber product, for example. Optionally, the powder mixture may be first pressed into a green ceramic and then heated.

Other aluminum compounds, e.g., $Al_2O_3 \cdot 3H_2O$, $Al_2O_3 \cdot H_2O$, $AlCl_3 \cdot 6H_2O$, and $AlCl_3$, $Al(NO_3)_3 \cdot 9H_2O$; may be used along with boric acid, e.g., $H_3BO_3$, to produce the material, e.g. powder or fibers, for forming into the ceramic product.

In either embodiment, the heated material may be particularized such as by grinding or the like to a powder size of $-325$ mesh (Tyler), e.g., 0.4 to 30 micrometers, typically and average particle size of 0.6 to 1.0 micrometers and then pressed into the desired shape and sintered at a temperature of from about 1300° to 1400° C. for a period of from about 5 minutes to 2 hours while maintaining the ceramic under a pressure of about 2500 to 3500 psi using a non-reactive die surface such as a graphite surface.

The resulting shaped aluminum borate product comprises a high strength, low density gray opaque material having an MOR of approximately 47,000 psi, a hardness of 1300 VPN and a density of 2.92 grams per cubic centimeter ($g/cm^3$).

While the inventor does not wish to be bound by any theory of why the resulting aluminum borate material possesses such strength while exhibiting such a low density, it appears that the aluminum oxide and boron oxide are reacting together to form a crystal structure less dense, i.e., more open, then that of the aluminum oxide. Thus even though the less dense boron oxide material is only present in an aluminum oxide/boron oxide molar ratio of 9:2, the reduction of the density of the aluminum borate product from that of aluminum oxide is, surprisingly, a drop of from 3.9 down to 2.9. That is, since the molar percentage of the aluminum oxide is 82% (87 wt.%) in the aluminum borate composition and that of the boron oxide only 22% (13 wt.%), one would not expect such a drastic reduction in density in the final product from that of the predominantly aluminum oxide component absent a change in the crystallography of the resultant product. Furthermore, it must be noted that the resulting product, apparently due to the pressure used in forming the product, has a density which is almost 99% of theoretical, i.e., there is very little porosity in the final product.

Aluminum borate materials formed in accordance with the invention may be used as wear and abrasive surfaces for dies for drawing, forming, or extrusion; finishing operations such as cutting tools and machining tools; surface coatings such as, for example, marble-like floor coatings; adiabatic engine components; and protective cladding. The aluminum borate materials of the invention may also find utility in combination with other materials such as dispersion strengthened metals and structural composites of metal and ceramic matrices.

The aluminum borate material of the invention may also be blended with up to 95 vol.%, typically 25 to 50 vol.%, of other materials to obtain composites with other properties. For example, the aluminum borate may be mixed with $TiB_2$, $ZrB_2$ or $B_4C$ to obtain a composite product, if desired, while retaining the high strength properties of the aluminum borate. $Al_2O_3$ and other metal oxides, borides, carbides and/or nitrides, e.g., $TiB_2$, BN, SiC, ZrN or ZrC, HfN, HfC, may also be blended with the aluminum borate. To provide a material with enhanced toughness, from 5 to 30 vol.% of a mixture of $ZrO_2$—$Y_2O_3$ or $HfO_2$—$Y_2O_3$ may be added to the aluminum borate. Preferably such materials are added to the powdered mixture of aluminum borate prior to the pressurized sintering step.

The pressure may be dispensed with during the sintering step if it is desired to produce a more porous product. For example, an aluminum borate having a porosity of 20% may be produced by sintering the particulate in an open furnace without restraining the sintered mass. A porous aluminum borate and titanium or zirconium boride mixture may also be obtained by reacion sintering a mixture of titanium or zirconium oxide with boria, alumina and aluminum in accordance with one of the following formulas:

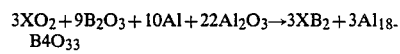

$3XO_2 + 9B_2O_3 + 10Al + 22Al_2O_3 \rightarrow 3XB_2 + 3Al_{18}B_4O_{33}$

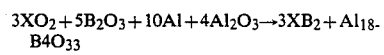

$3XO_2 + 5B_2O_3 + 10Al + 4Al_2O_3 \rightarrow 3XB_2 + Al_{18}B_4O_{33}$

Wherein X = titanium or zirconium.

Such a porous material could be further modified by impregnating the pores of the ceramic material with a metal such as aluminum or steel to produce a cermet with enhanced properties.

EXAMPLE 1

Figure 2A:
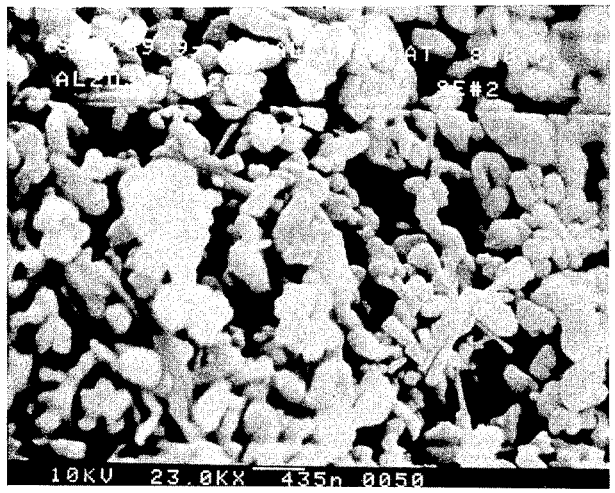
FIGS. 2a, 2b, 2c, 2d, and 2e are a series of micrographs showing the product formation in accordance with the invention at different temperatures.
Figure 2B:
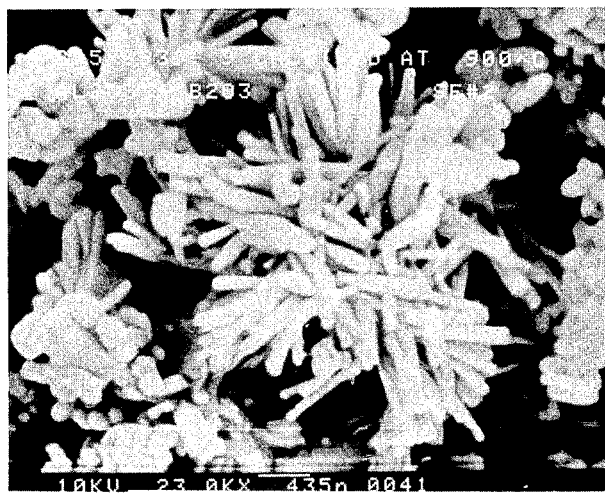
Figure 2C:
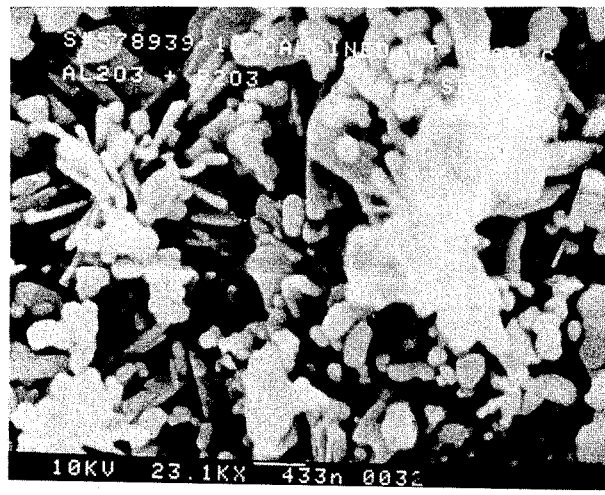

A mixture of powder containing 86.83 wt.% alumina A-16-SG and 13.17 wt.% boron oxide were mixed and calcined at 800° C. The materials resulting from the calcination are shown in FIG. 2a. This material was then heated further to 900° C. and is shown in FIG. 2b. It will be noted that after treating to 900° C., some of the particles are needle shaped. The same was true when the material was further treated to 1000° C.

Figure 2D:
Figure 2E:
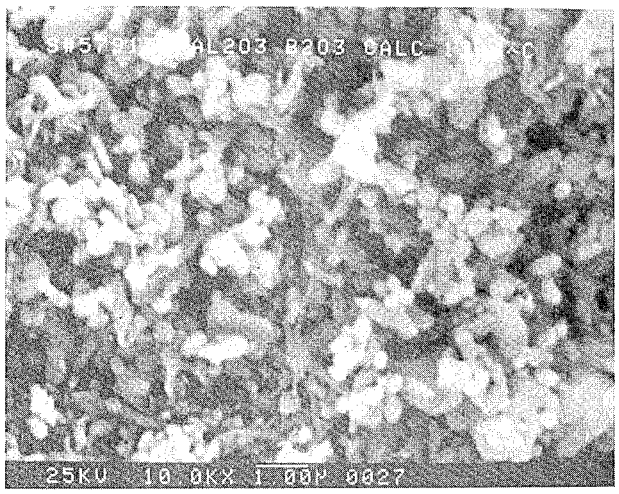

On heating up to 1000° C., it will be noted that the major constituents are $Al_2O_3$ and $2Al_2O_3 \cdot B_2O_3$ type phase. On further heating to 1150° C., that there was a major phase change; that is, the major constituent form was $Al_{18}B_4O_{33}$ and the minor was $Al_2O_3$ (FIG. 2d). The material was further heated to 1300° C. and is shown in FIG. 2e. It will be seen that calcination of alumina and boria powder at a temperature of about 1150° C. resulted in the formation of $Al_{18}B_4O_{33}$.

The $Al_{18}B_4O_{33}$ material was ground to a particle size in the range of 0.5 to 10 micrometers and subsequently hot pressed at 1350° C. in a graphite mold to provide a density of 2.92 gm/cc (99% dense). The ceramic material formed had a thermal expansion coefficient ($3.9 \times 10^{-6}$ cm/cm/°K.), and thermal conductivity of 0.065 W/cm/K. In addition, the material had a MOR strength of 47,000 psi, a hardness of 1300 VPN and an elastic modulus of $31.8 \times 10^6$ psi.

EXAMPLE 2

A number of $B_4C$—$Al_{18}B_4O_{33}$ composites was fabricated to study their sintering behavior. 25 wt.% $B_4C$ 75 wt.% $Al_{18}B_4O_{33}$ and 50 wt.% $B_4C$ 50 wt.% $Al_{18}B_4O_{33}$ mixtures were used to study properties of the composite. Unlike $Al_{18}B_4O_{33}$ monolithic body, 25% $B_4C$—$Al_{18}B_4O_{33}$ could not be hot pressed to full density at 1350° C. However, the material densified to nearly full density at 1750° C. This material has a density of 2.76 g/cc and a hardness of nearly 1600 VPN compared to a density of 2.92 g/cc and a hardness of 1300 VPN for monolithic $Al_{18}B_4O_{33}$ body.

Thus the shaped aluminum borate product of the invention comprises a high strength and low density material which may be produced in a variety of formed shapes. The product may be used by itself or as a valuable precursor for use in connection with other materials to achieve a variety of desired physical properties.

Having thus described the invention, what is claimed is:

1. A shaped high strength sintered aluminum borate composite ceramic product consisting essentially of a mixture of:
    (a) $Al_xB_yO_z$ wherein x is in the range of 16 to 22, y is in the range of 2 to 5, and z is in the range of 30 to 36; and
    (b) a metal compound selected from the class consisting of a metal carbide and a metal nitride;
and formed by particularizing said mixture to a particulate having an average particle size of $-325$ mesh (Tyler); pressing said particulate into a shaped product; and sintering said shaped product into a shaped high strength sintered aluminum borate composite ceramic product.

2. The composite in accordance with claim 1 wherein the metal in said metal compound is at least one of the metals from the group consisting of Ti, Zr, Hf, Si and B.

3. The composite in accordance with claim 1 wherein the metal compound is in the range of 25 to 50 vol.%, the remainder aluminum borate.

4. A shaped high strength sintered aluminum borate composite ceramic product consisting essentially of a mixture of:
    (a) $Al_{18}B_4O_{33}$; and
    (b) from 25 to 50 vol.% of a metal compound selected from the class consisting of a metal carbide and a metal nitride;
and formed by particularizing said mixture to a particulate having an average particle size of $-325$ mesh (Tyler); pressing said particulate into a shaped product; and sintering said shaped product at a temperature of from about 1300° to 1400° C. into a shaped high strength sintered aluminum borate composite ceramic product.

5. The shaped high strength sintered aluminum borate composite ceramic product of claim 4 wherein said shaped product is sintered while maintaining a pressure of 2500 to 3500 psi on the particulate during sintering.

6. A shaped high strength sintered aluminum borate composite ceramic product consisting essentially of a mixture of:
    (a) $Al_xB_yO_z$ wherein x is in the range of 16 to 22, y is in the range of 2 to 5, and z is in the range of 30 to 36; and
    (b) a metal carbide selected from the class consisting of a carbide of Hf, Zr, B, Si, and Ti;
and formed by particularizing said mixture to a particulate having an average particle size of $-325$ mesh (Tyler); pressing said particulate into a shaped product; and sintering said shaped product into a shaped high strength sintered aluminum borate composite ceramic product.

7. The composite in accordance with claim 6 wherein the metal compound is $B_4C$.

8. The composite in accordance with claim 6 wherein said metal carbide is in the range of 25 to 50 vol.%, the remainder aluminum borate.

9. A shaped high strength sintered aluminum borate composite ceramic product consisting essentially of a mixture of:
    (a) $Al_xB_6O_z$ wherein x is in the range of 16 to 22, y is in the range of 2 to 5, and z is in the range of 30 to 36; and
    (b) a metal nitride selected from the class consisting of a nitride of Zr, Hf, B, Si, and Al; and
formed by particularizing said mixture to a particulate having an average particle size of $-325$ mesh (Tyler); pressing said particulate into a shaped product; and sintering said shaped product into a shaped high strength sintered aluminum borate composite ceramic product.

10. The composite in accordance with claim 9 wherein said metal nitride is in the range of 25 to 50 vol.%, the remainder aluminum borate.

11. The composite in accordance with claim 1 wherein the metal compound is aluminum nitride.

* * * * *